United States Patent Office 2,769,074
Patented Oct. 30, 1956

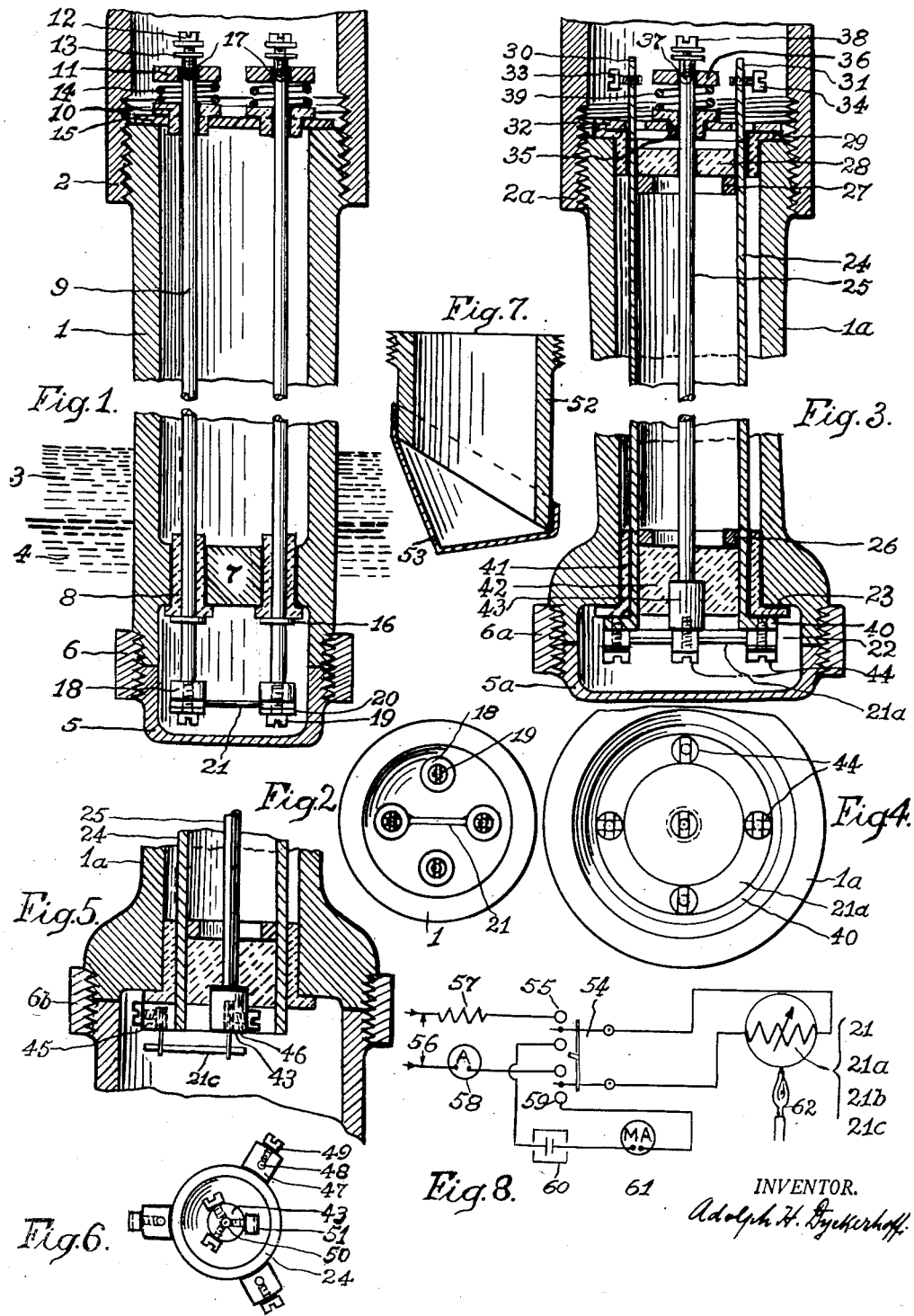

2,769,074

PYRISTOR—DEVICE FOR RAPID MEASUREMENT OF HIGH TEMPERATURES OF FLUIDS UP TO 4000° F.

Adolph H. Dyckerhoff, Evanston, Ill.

Application May 9, 1951, Serial No. 225,403

18 Claims. (Cl. 201—63)

My present invention relates to an improvement in the structure of a device and an improved, more rapid method for determining or measuring high temperatures of fluids, liquid and gaseous up to 4000° F. The improvement in construction and method relates particularly to the application of a high temperature measurement device of various forms for liquid materials, such as glass and the like, as iron, steel and other metals, while these materials are being prepared in furnaces, kilns, or held in ladles and the like. Reference is made to United States Patent 1,613,877 granted to this inventor on January 11th, 1927, which discloses an early form of high temperature measuring device. The present invention constitutes several distinct improvements thereof for the reason that the practical application of the device covered by that patent is limited, due to the weight and lack of strength of the refractory member or graphite body housing the measuring element in a recess in it's lower end and also due to the somewhat slow response of the measuring element consisting of an oxide of rare earth metals or a mixture of several oxides of rare earth metals. Some of said measuring elements or resistors being able to stand very high temperatures have large negative temperature coefficients of electrical resistance and permit considerably increased passage of electric current at very high temperatures. The amount of current flowing through the element indicates, by means of a calibration, the temperature of the element and thereby the temperature of the surrounding fluid. In view of the changed classification of rare earth and the high temperature of 4000° F. to be measured with the device, which temperature requires a melting temperature of the measuring element or resistor of about 4400° F., the group of oxides suitable for such purpose extends beyond the group of rare earth under present classification. My improvement consists of a new expansible internal spacing arrangement of conductors designed to give both strength and flexibility with thermal expansion within the device, including a detachable cap and a slanting open end attachment with slag separator, further, of new forms of measuring elements and of electric terminals, of the multiple application of electric conductors and electric measuring elements or resistors and a method for reducing the time of actual temperature measurement.

Summarizing, my present invention embodying a device called Pyristor aims at making possible rapid temperature measurements of fluids up to 4000° F. The invention is characterized by two or more rods and one tube in conjunction with one rod, all composed of siliconized molybdenum or other ceramic coated or treated refractory metals or a mixture of same. Such rods, or tube rod combination, having good mechanical strength at high temperatures are in such a way secured to a tubular graphite or refractory member at both ends, so as to give structural strength to the tubular graphite member, permitting thereby a small wall thickness of same. Provision is made by means of siliconized molybdenum springs to allow rods and tube rod combination to elongate or expand at high temperatures. These rods and the tube rod combination also serve as electric conductors; there is attached to one end of such conductor bracers the measuring element or resistor. Other improvements consist of a threaded cap which can be attached to the tubular graphite or refractory member by means of a threaded graphite coupling and also a short, open end, slanting graphite or refractory tube. This slanting tube is threaded at one end for attaching same to the tubular graphite or refractory member by means of a threaded coupling. Another improvement consists of a light metallic or cardboard conical cover which is slipped over the open end of the slanting graphite tube and which serves the purpose of cutting through the slag floating on top of a liquid metal bath. The conical cover is readily absorbed by the liquid metal. While the foregoing improvements pertain mostly to the construction of the device, my invention also embodies measuring elements or resistors having either circular or ribbon-like shape, provided with oblong openings for attaching same by means of high temperature enduring electric terminals to rod conductors or tube rod conductors, and also cylindrical resistors being connected electrically to the conductors by means of siliconized molybdenum wire or strip. My invention also covers the multiple use of conductor rods and several measuring elements contained within one tubular graphite or refractory member, reducing thereby the number of conductors. Another improvement in the art of taking high temperature measurements consists of a new method of reducing the time required for the immersion of the device into the fluid or liquid metal. This is accomplished by connecting the measuring element to a standard supply of electric energy of suitable voltage and by preheating the measuring element or resistor at the same time with any suitable source of heat, gaseous, electrical, chemical and the like. This method causes the element to assume rapidly a high temperature and retain it after removal of the external heat source. The temperature which the measuring element is allowed to assume before immersion into the fluid is slightly below the temperature of the fluid to be measured by immersion so that the increase of temperature being forced on the measuring element or resistor by the fluid is very small, reducing thereby the time of actual exposure to any detrimental effects of the fluid.

In the period after World War II, renewed interest was shown in industries for high temperature measurements in the endeavor to improve products, reduce costs and to promote new developments. Particularly, the steel producing industry has taken considerable cognizance of the value of high temperature measurements and reduced losses in open hearth and electric furnace shops. The optical pyrometer has been practically discarded for steel producing furnaces. A survey seems to indicate that so far the immersion platinum platinum-rhodium thermocouple is favored by practical steel producers. However, such thermocouples have several drawbacks. A common feature of all immersion thermocouples is the use of a closed end silica tube for housing the hot junction. The thinner the wall and the smaller the diameter of the silica tube, the faster the reading but the more fragile the tube and the less enduring. The melting point of such silica tubes is approximately 3150° F., while temperatures of steel in electric furnaces of 3385° F. have been observed. Most thermocouple readings require about thirty to forty seconds for the immersion. The small silica tube must be replaced after one or two measurements. Since silica is an electric conductor at very high temperatures, there is possibility of some leakage of the electric current generated in the hot junction. After five or six readings the tip of the thermocouple must be cut off, the remaining wire checked for contamination and a new tip welded, annealed and calibrated. While these elucidations cover but one application, namely, for steel production, they are very illustrative and show that there is room for improvement. In this respect my new invention covered by these specifications represents an improvement over my previous patent and shows a progress in this art of engineering.

My invention will be more fully and better understood by referring to the accompanying sheet of drawings in which—

Figure 1 is a vertical sectional view which illustrates one arrangement of the device embodying special refractory metal rods serving simultaneously as electric conductors and bracers of a tubular graphite or refractory member: it also shows the suspension of the rods and their structural connection to the tubular graphite or refractory member, further, a method of attaching a graphite cap to the latter by means of a threaded coupling and finally, the means of connecting the small high temperature measuring element or resistor to the rods made of specially treated metals, such as siliconized molybdenum.

Figure 2 is a horizontal plan view of one end of the device shown in Figure 1 after removal of the graphite cap and of the graphite coupling and illustrates another part of my invention, namely, the application of several conductor rods within one tubular graphite or refractory body.

Figure 3 is a vertical sectional view which shows another construction of the device incorporating a tube and a rod, both made of a specially treated refractory metal and both performing the function of conductor and structural bracer of the tubular graphite or refractory member, and also the attachment of tube and rod to the tubular graphite or refractory member, as well as the attachment of the disc shaped measuring element or resistor to rod and tube.

Figure 4 is a horizontal plan view of the lower end of the device illustrated in Figure 3 after removal of the graphite cap and graphite coupling, showing disc shaped resistor and also ribbon shaped resistor in dotted lines.

Figure 5 is a vertical sectional view of the lower end of the device shown in Figure 3, illustrating a multiple terminal arrangement for attaching measuring elements to conductor tube and conductor rod.

Figure 6 is a horizontal plan view of the multiple terminal arrangement of the device shown in Figure 5 after removal of graphite cap and graphite coupling.

Figure 7 is a vertical sectional view of a short open end slanting graphite or refractory tube with a slipped on thin walled metallic or cardboard conical cover.

Figure 8 is a simplified diagram of electrical circuits invented for the preheating of the measuring element or resistor and in ascertaining or measuring rapidly high temperatures of fluids and particularly of liquids as molten metals such as steel, iron and the like.

Referring now specifically to the drawings I provide, as shown in Figure 1, a tubular, cylindrical body or member 1 composed of graphite or other highly refractory material and threaded at both ends at the outer circumference. The upper end connects in threaded engagement with a holder 2 made of special alloy steel which holder in turn is attached to a handle made of the same kind of steel. At the lower end, which is inserted into the fluid composed of slag 3 and molten metal 4 when measuring the temperature of a liquid metal, I have provided a detachable, thin walled cap 5, composed of graphite or other refractory material, which cap 5 is joined to the graphite or refractory member by means of a coupling 6, composed of graphite or other refractory material, in threaded engagement. The graphite or refractory member 1 has a narrow transverse wall 7 having two or more openings through which two or more highly refractory flanged bushings 8 pass. Extending through these bushings 8 and longitudinally through refractory member 1 are two or more rods 9 composed of siliconized molybdenum or other machinable ceramic coated or treated refractory metals or a mixture of same. These rods 9 extend at the upper end of refractory member 1 through high temperature refractory flanged bushings 10 and collars 11, composed of siliconized molybdenum or other ceramic coated or treated refractory metals or a mixture of same, and end in electric contact terminals consisting of screws 12 and washers 13. Bushings 10 and collars 11 are held apart by springs 14. Bushings 10 are held in position by being fitted into the disc 15 which disc rests on the transverse end wall of refractory member 1. Disc 15 is closely fitted into tube 2. This disc 15, springs 14, terminal screws 12 and washers 13 are composed of siliconized molybdenum or other machinable ceramic coated or treated refractory metals or a mixture of same. Rods 9 are provided with a ring 16 bearing against the lower surface of the flange of bushings 8. After the rods 9 have been placed from below into their position as described, and shown in Figure 1, springs 14 are slightly compressed and held in position by collars 11 and set screws 17. Collar 11 is provided with a threaded aperture through which said screw 17 engages and impinges upon rod 9 to hold collar 11 at any desired position thereon. Thus, rods 9 serve two purposes, they are the electric conductors and bracers giving strength to the thin walled graphite or refractory member 1 and permitting thus the use of the device in other positions in addition to the vertical position. Molybdenum has a high mechanical strength at high temperatures, uniform stresses in rods 9 when assuming high temperatures are maintained by providing springs 14. At their lower ends, rods 9 have a cylindrical enlargement 18, having a tapped bore and terminal screws 19 and washers 20 by means of which the measuring element or resistor 21 is secured to the conductor rods and electrically connected.

As stated before, two or more rods can be used in this invention as conductors and structural bracers. Each pair of rods may be connected with one measuring element. Figure 2, a horizontal plan view of the lower end of the device illustrated in Figure 1, after removal of the graphite cap 5 and graphite coupling 6, shows two pairs of electric conductor-bracer rods, one pair of which is connected electrically to a measuring element. While Figure 2 illustrates two pairs of conductor rods, one pair connected to a measuring element or resistor 21, my invention embodies also the multiple arrangement of conductor rods and measuring elements within one tubular graphite or refractory member 1 in which one conductor is employed as a common conductor for two or more measuring elements or resistors.

My invention also relates to a device serving the same purpose embodying a somewhat different construction which is illustrated in Figure 3. Here I provide a tubular body or member 1a, composed of graphite or highly refractory material and threaded at both ends at its outer circumference. The thickness of the wall of the tubular member 1a increases towards the upper end to allow for the destructive action of the slag of a liquid metal bath. As in Figure 1, the upper end of the graphite or refractory body 1a connects in threaded engagement with holder 2a made of special alloy steel which holder 2a in turn is attached to a handle made of the same kind of steel. In contrast with Figure 1, refractory member 1a has no transverse wall but is bell shaped at its lower end and permits thereby the formation of an adequate recess 22 and shoulder 23. Also, this device provides a detachable, threaded thin wall cap 5a, composed of graphite or other refractory material which cap 5a is joined in threaded engagement to the refractory member 1a by means of a coupling 6a composed of the same material as 5a. Extending longitudinally through the graphite or refractory member 1a are two electric conductors, a tubular body 24 and a rod 25, both composed of siliconized molybdenum or other ceramic coated or treated refractory metals or a mixture of same. Two rings 26 and 27 composed of the same material as the tubular body 24, are attached to the inner wall of tubular body 24, one close to the upper end the other close to the lower end. At the upper end of tubular conductor 24, a ring 28 composed of highly refractory material rests on ring 27. The flanged bushing 29, also made of highly refractory material and its flange resting on the upper transverse wall surface of refractory member 1a is interposed between the inner wall of the latter and the outer wall of tubular conductor 24, thereby insulating this body 24 and securing it to refractory member 1a. Two small segments 30 and 31 of tubular conductor 24 extend through openings in a disc 32, which is supported by the flange of bushing 29, and are provided with terminal screws 33 and 34. Disc 32 is composed of siliconized molybdenum or other machinable ceramic coated or treated refractory metals or a mixture of same. The other electric conductor, rod 25, extends closely fitted through an opening in refractory ring 28, through refractory bushing 35 and then through an opening in collar 36, having a set screw 37, and is ending in terminal screw 38. Disc 32 supports the flange of refractory bushing 35 which is held apart from collar 36 by spring 39 composed of siliconized molybdenum or the like. The position of collar 36 is fixed by set screw 37. At its lower end, the tubular conductor 24 provided with a flange 40, is insulated in close fit from graphite or refractory member 1a by a flanged refractory bushing 41 and from conductor rod 25 by a circular block 42, also composed of highly refractory material. Into this circular refractory block 42 fits closely an enlargement 43 of conductor rod 25. When drawing this conductor rod 25 upward, a firm grip is established between the electric conductors 24 and 25 and refractory member 1a by means of a flange 40 of conductor 24, by refractory body 42 and refractory bushing 41. A similar firm contact is achieved at the upper end of refractory member 1a by compressing spring 39 and tightening set screw 37 in collar 36. By this design the electric conductors, tubular body 24 and rod 25, give the refractory member 1a added strength. The enlargement 43 of conductor rod 25 and flange 40 of conductor 24 are tapped to accommodate screws 44 by means of which the measuring element or resistor 21a is attached to conductors 24 and 25. Screws 44 are composed of siliconized molybdenum or similar machinable ceramic coated or treated refractory metals or a mixture of same. The measuring element or resistor 21a here has the shape of a thin disc as is illustrated in Figure 4, after removal of cap 5a and coupling 6a and is provided with five openings to permit passage of screws 44. The four openings near the outer rim of element 21a are oblong in radial direction. The use of a disc shaped resistor however does not preclude the application of cylindrical resistor or resistors 21, shown in Figure 1, to the construction shown in Figure 3. In the embodiment shown in Figure 4 the central conductor rod 25 serves as a common conductor for the central portion of ribbon element 21b, and measurements can be taken from said conductor rod 25 across to either end of ribbon element 21b. In Figure 6, where three measuring elements may be electrically connected to conductor 25, it serves as a common conductor.

A modification of the device as illustrated in Figure 3, is shown in Figure 5 which depicts the lower end of the device having a somewhat different method of attaching the measuring element or elements to the electric conductors 24 and 25. The measuring element 21c here has cylindrical shape. Wire or strip siliconized molybdenum or the like connects the measuring element or resistor 21c electrically with terminal 45 of conductor 24 and with terminal 46 of conductor 25. The arrangement of terminals of conductors 24 and 25 is illustrated in Figure 6. The electric terminal 45 of conductor 24 consists of three small segments, 47, composed of siliconized molybdenum or other machinable ceramic coated or treated refractory metals or a mixture of same, which segments are attached to conductor tube 24. Each segment has an opening 48 and is threaded for terminal screws 49, likewise composed of siliconized molybdenum or the like, which screws provide a good contact with the siliconized molybdenum wire or strip attached to the measuring element. The terminal of conductor rod 25 consists of the cylindrical enlargement 43 which has an opening 50 and which is threaded for three terminal screws 51 providing the second electrical connection with the measuring element 21c. If so desired, more than three terminal segments for conductor 24 and more than three terminal screws for conductor 25 can be applied.

It is desirable at times when measuring the temperature of fluids to insert the device into the fluid in another position then at 90° from the horizontal and to use an open end tube. My invention provides for such a condition as illustrated in Figure 7 which covers a short open end slanting graphite or refractory tube which is threaded at one end and which can be attached to the graphite or refractory member 1 or 1a by means of a threaded coupling 6 or 6a, composed of graphite or refractory material. The degree of slanting of this short tube 52 depends on the angle at which the device is to be inserted into the fluid: this slanting, or diagonal cut, of tube 52 serves the purpose of closing its open end equally around it's circumference about simultaneously to the intruding fluid. Over this refractory tube 52 there is, before inserting the device into the fluid, slipped a thin walled metallic or cardboard conical cover 53. This cover 53 serves several purposes when the device is placed into the fluid such as liquid metal, namely, to prevent the boiling fluid from splashing into the open end, to divide the slag floating on top of the liquid metal and to prevent it from remaining in front of the open end.

In the foregoing description of the various constructions of the device invented by me, I have embodied measuring elements or resistors which must have certain characteristics in order to fulfill the purpose of my invention, namely, the measuring of the temperature of fluids up to 4000° F. Therefore, I provide in conjunction with the several constructions of my device and within the scope of this invention, measuring elements or resistors composed of, chiefly, an oxide of beryllium, cerium, hafnium, lanthanum, samarium, scandium, strontium, thorium, zirconium, yttrium or a mixture of several such oxides.

The cardinal part of the invention and applicable to the several constructions of the device is the method of reducing the actual time required for the immersion of the device into the fluid or liquid metal bath, namely, by pre-heating the high temperature oxide resistor or measuring element. Figure 8 illustrates this method in a simplified circuit or wiring diagram. The measuring element 21, 21a, 21b or 21c is connected by means of a change-over switch 54 when in position 55, to a supply of electric energy 56, having a voltage commensurate with the material and dimensions selected for the measuring element. In series with the element in this position 55 is a ballast or resistance 57, serving the purpose of preventing an overvoltage from harming the measuring element 21, and also an ammeter 58. When placing the change-over switch to the other position 59, the element is connected to an electrical energy source of low voltage 60 and a milliammeter 61 calibrated in degrees F. The source of energy for preheating the measuring element or oxide resistor is identified by flame 62.

In the operation of the device the measuring element or high temperature oxide resistor is subjected to heat from any suitable source of energy 62 which application of heat decreases the electrical resistance of the element and thereby increases its conductivity. As result an electric current commences to flow when the change-over switch 54 connects the element to a source of electric energy 56 having a commensurate voltage, the element will assume a glow increasing to brightness, depending on the temperature applied by the heat source 62 and the current allowed to flow, as shown by ammeter 58. At a certain amount of such current corresponding to a certain temperature of the measuring element, the device is ready for the immersion. The temperature chosen for the measuring element before its immersion is slightly below the expected temperature of the fluid. Depending on conditions, cap 5 or 5a, as illustrated in Figure 1 and Figure 3, or an open end tube with slipped on cover 53 as depicted in Figure 7, is then attached to the graphite or refractory member 1 or 1a by means of graphite coupling 6 or 6a and then the device, connected by holder 2 to a steel handle, inserted into the fluid or liquid metal and the change-over switch 54 placed in position 59 connecting thereby the measuring element or oxide resistor with electrical energy source of low voltage 60 and milliammeter 61 serving as a temperature indicator. Since the temperature which the measuring element is allowed to assume just before immersion or while it is being inserted into the fluid, is slightly below the expected temperature of the fluid or liquid metal, the time of immersion is very short and thereby any detrimental effects of the fluid on the device reduced. An automatic control of the change of position of switch 54 as a function of the current indicated by ammeter 58 can be effected readily. This described method of operating the device, however, does not preclude the preheating of the oxide resistor before the immersion with cap 5 or 5a or with the tube 52 attached to the refractory member 1 or 1a. The oxide resistors may also be preheated to a temperature slightly below the anticipated temperature of the fluid to be measured during and/or after immersion of the instrument therein. This preheating may be accomplished by connecting the resistors to an electric energy source of sufficiently high voltage before, during or after immersion into the fluid. The heat imparted to the resistors by the hot fluid increases the electric conductivity of the resistors sufficiently to cause the flow of a high electric current, the heat of which plus the heat of the hot fluid bring the resistors as well as the media, as various gases surrounding the resistors and component parts of the instrument, to a temperature somewhat below the expected temperature of the fluid itself. At this point, the resistors are disconnected from the electric energy source of high voltage and connected to the measuring circuit having a low voltage source of energy.

While I have described more or less precisely the details of various constructions which I employ, I do not wish to be understood as limiting myself thereto, as I contemplate changes in form and the proportion of parts and the substitute of equivalents as circumstances may suggest or render expedient without departing from the spirit or scope of my invention.

I claim:

1. A temperature responsive device having a tubular refractory body, a plurality of measuring element holding means mounted in insulated relationship within said refractory body, temperature responsive measuring elements connected between contiguous portions of said holding means and at least one of said holding means being expansibly mounted and connected at its end to each of said temperature responsive measuring elements.

2. A high temperature measuring device comprising an elongated tubular refractory housing, an apertured transverse wall at each end of said housing, insulating means within said apertures, at least one pair of electrical conductor rods extending longitudinally within said housing between said transverse walls and through said insulating means, said conductor rods extending beyond said transverse walls to provide contiguous ends, electrical resistance elements connected between the contiguous ends at one terminus of said rods, said conductor rods being affixed to said insulating means in one of said transverse walls, the opposite contiguous ends of said conductor rods provided with means to hold said rods under tensive force between said transverse walls to give strength and rigidity to said housing under thermal expansion conditions.

3. A high temperature device in accordance with claim 2 in which said electrical conductors are composed of refractory materials selected from the group consisting of refractory metals, mixtures of refractory metals, coated refractory metals, and treated mixtures of refractory metals.

4. A high temperature device in accordance with claim 2 in which said resistor elements are composed of oxides of rare earth metals including zirconium oxide and thorium oxide.

5. A high temperature device in accordance with claim 2 in which the means for retaining said conductors under tension comprises the combination of circumferential end supports for each of said conductors and spring-tensioning means between one of said supports on each conductor and a terminus thereof.

6. A high temperature measuring device comprising a tubular refractory housing, rod-like electrical conductors mounted in spaced and insulated relationship within the length of said housing by means of a transverse wall at one end of said housing and circumferential support means at the other end of said housing, said conductors being insulated from said transverse wall and said support means by ceramic bushings, said rods each having shoulder means to bear upon the outside surface of the bushings in the transverse wall and spring-tensioning means between the other termini of said conductors and the bushings within the circumferential support means.

7. A high temperature measuring device in accordance with claim 6 in which the tubular housing is closed adjacent said transverse wall by a refractory cap member, said refractory cap memhber being attached to said housing in threaded engagement.

8. A high temperature measuring device in accordance with claim 6 in which the tubular housing is attached to a tube of the same material in threaded engagement, said tube having a truncated edge covered with burnable material.

9. A high temperature measuring device comprising, in combination, a tubular refractory housing, at least two rod-like electrical conductors mounted in spaced, insulated, and supporting relationship within said housing by means of an apertured transverse wall at one end of said housing and an apertured disc at the other end of said housing, the apertures of said transverse wall and said disc being fitted with ceramic bushings through which said conductors pass, said conductors having retaining shoulders resting on the bushings of said transverse wall, the ends of said conductors extending beyond said transverse wall and apertured disc, means attached to the ends of said conductors for making electrical connection thereto, adjustable stop means adjacent said electrical connection means, expansible members encompassing contiguous ends of said conductors, said expansible members being sustained by spring-tension means between said stop means and said ceramic bushings within said apertured disc to thereby hold said conductors under protraction and give rigidity to said housing.

10. A high temperature measuring device in accordance with claim 9 in which one of said conductors is a common conductor for two or more resistor elements connected at the ends of said conductors extending beyond said transverse wall and the remaining conductors are connected to the opposite ends of said resistor elements from said common conductor.

11. A high temperature measuring device in accordance with claim 9 in which one of said rod-like electrical conductors is a common conductor for two or more resistor elements connected at the ends of said conductors extending beyond said transverse wall, said common conductor rod being electrically connected to one end of said resistor elements and the remaining conductors being connected to the opposite ends of said resistor elements from said common conductor.

12. A high temperature measuring device comprising, in combination, a tubular refractory housing, a tubular conductor rigidly mounted in insulated relationship within said housing, said tubular conductor having a circumferential end terminating within a covered end portion of said housing, said circumferential end having a plurality of means for making electrical connection thereto, a rod-like conductor mounted in spaced, longitudinal relationship within said tubular conductor, said rod-like conductor having one end thereof expansibly mounted at one end of said housing, the other end of said rod-like conductor terminating in fixed spaced relationship with said circumferential end of said tubular conductor and the means thereon for attaching resistance elements.

13. A device in accordance with claim 12 in which said resistance element comprises a disc attached at its center to said rod-like conductor and attached at its periphery to said plurality of electrical connection means.

14. A device in accordance with claim 12 in which said resistance element is ribbon-shaped and attached at its center to said rod-like conductor and at its ends to said tubular conductor.

15. A device in accordance with claim 12 in which said electrical connection means comprises set screws engaging threaded apertures in said conductors.

16. A high temperature measuring device adapted to be immersed in a molten liquid having a layer of slag thereover comprising in combination with a tubular housing having a handle end and an open end wherein are exposed resistance elements having negative temperature coefficients of electrical resistance, a cover for said open end, said covering being composed of material which is destroyed by said molten metal.

17. A device in accordance with claim 16 in which said open end of said housing is truncated, said cover is conical and has a corresponding truncated base opening adapted to encompass and engage said truncated open end of said housing.

18. A device in accordance with claim 16 in which said cover is composed of heavy bodied cardboard.

References Cited in the file of this patent

UNITED STATES PATENTS

| | | |
|---|---|---|
| 1,613,877 | Dyckerhoff | Jan. 11, 1927 |
| 1,724,469 | Ghadiali | Aug. 13, 1929 |
| 1,797,712 | Brodnax | Mar. 24, 1931 |
| 2,120,374 | Ruben | June 14, 1938 |
| 2,365,706 | Keinath | Dec. 26, 1944 |
| 2,379,317 | Picciano | June 26, 1945 |